US006175853B1

(12) United States Patent
Stracke, Jr.

(10) Patent No.: US 6,175,853 B1
(45) Date of Patent: Jan. 16, 2001

(54) METHOD AND APPARATUS FOR A DISTRIBUTED LOCKING SYSTEM FOR A COLLABORATIVE COMPUTER SYSTEM

(75) Inventor: John Richard Stracke, Jr., Palo Alto, CA (US)

(73) Assignee: Netscape Communications Corporation, Mountain View, CA (US)

( * ) Notice: Under 35 U.S.C. 154(b), the term of this patent shall be extended for 0 days.

(21) Appl. No.: 08/714,943

(22) Filed: Sep. 17, 1996

(51) Int. Cl.[7] .................................................. G06F 9/00
(52) U.S. Cl. ........................ 709/107; 709/100; 709/104
(58) Field of Search .................................. 709/200, 300, 709/302, 100, 102, 104, 107, 108; 711/152; 710/200

(56) References Cited

U.S. PATENT DOCUMENTS

| 4,480,304 | * | 10/1984 | Carr et al. ............................ 710/200 |
| 5,008,853 | * | 4/1991 | Bly et al. ............................. 345/331 |
| 5,129,089 | * | 7/1992 | Nielsen ................................ 710/200 |
| 5,220,657 | * | 6/1993 | Bly et al. ............................. 711/152 |
| 5,339,427 | * | 8/1994 | Elko et al. ........................... 709/103 |
| 5,515,491 | * | 5/1996 | Bates et al. .......................... 345/331 |
| 5,619,726 | * | 4/1997 | Seconi et al. ......................... 710/22 |
| 5,724,508 | * | 3/1998 | Harple, Jr. ........................... 709/205 |
| 5,802,391 | * | 9/1998 | Chung-Shung ......................... 710/2 |

* cited by examiner

*Primary Examiner*—Majid Banankhah
(74) *Attorney, Agent, or Firm*—Michael A. Glenn; Don M. Hendricks

(57) ABSTRACT

A distributed locking apparatus for a collaborative computing system permits members of a collaborative session to obtain and transfer a lock without the use of a central lock server. Each member of the collaborative session has a lock engine, which transitions among four states depending on the location of the lock. An Available state indicates that the lock is available. A Pending state indicates that the member has requested the lock. A Held state indicates that the member currently holds the lock. A Locked state indicates that another member currently holds the lock. A message structure permits the members to obtain and release the lock and to resolve conflicts over the lock between members of the session.

19 Claims, 10 Drawing Sheets

METHOD AND APPARATUS FOR A DISTRIBUTED LOCKING SYSTEM FOR A COLLABORATIVE COMPUTER SYSTEM

FIELD OF THE INVENTION

This invention relates to the field of collaborative computing and, more particularly, to the control of processes in a collaborative computing system.

BACKGROUND OF THE INVENTION

In desktop video conferencing and other desktop collaboration systems, it is often necessary that certain processes be implemented only by a single member of the collaborative session. For example, setting the global conference settings or adding a new member to a video conference generally should be performed only by a single member.

In conventional video conferencing systems, a lock is established for these processes by a central lock server. Under the T.120 standard, the top provider serves as the lock server.

With a central lock server, the video conferencing session is dependent upon successful communication with, and the non-failure of, the central lock server. Failure of that lock server can cause the video conferencing session to end.

The present invention overcomes this and other deficiencies, as will be shown in the remainder of the specification, referring to the attached drawings.

SUMMARY OF THE INVENTION

The present invention provides a robust locking system through the use of a distributed locking apparatus.

In a preferred embodiment, each member of a collaborative session has a separate lock engine for each lock. The collaborative session can be implemented, for example, through the collaborative computing system described in commonly-assigned U.S. patent application Ser. No. 08/401,922, entitled "Apparatus for Collaborative Computing," which is incorporated herein by reference. With this implementation, the lock engine may be implemented as a lock plugin. Alternatively, other collaborative computing architectures can be used.

The lock engine can be in any of four states at any time during a collaborative session: AVAILABLE, PENDING, HELD, or LOCKED. The AVAILABLE state indicates that the session member is not aware of any member who holds the lock. Hence, the lock is available. The PENDING state indicates that the session member has sent a request for the lock to the other session members and is awaiting acknowledgment from the other members. The HELD state indicates that the session member currently holds the lock. The LOCKED state indicates that another session member currently holds the lock.

In order to obtain the lock, a member sends a Request for Lock message, which normally will be acknowledged by the other members. If another member has the lock, it will send a Negative Acknowledgment message back to the requesting member. If the lock is available, the requesting member will receive acknowledgments from each other member, and transition to the HELD state.

In order to release the lock, a member sends a Release Lock message to the other members, which will cause them to transition from the LOCKED state to the AVAILABLE state.

When a new member joins the collaborative session, a member that holds the lock will send a Claim message to the new member, informing the new member that the lock is held. The new member will then transition from its initial AVAILABLE state to the LOCKED state.

Preferably, conflicts between session member requests are resolved by giving preference to the member with the lower handle.

DETAILED DESCRIPTION OF PREFERRED EMBODIMENTS

Figure 1:
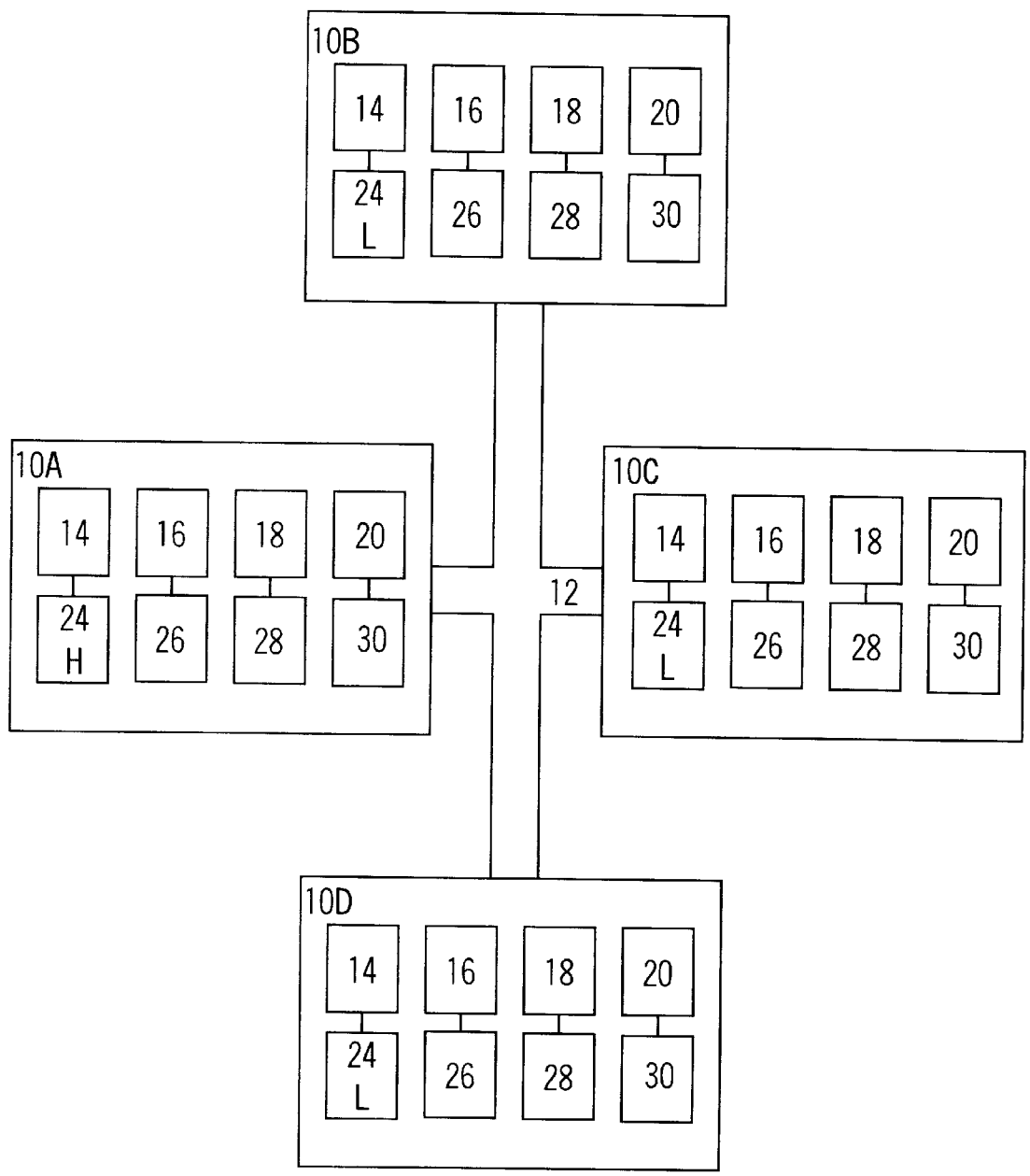
FIG. 1 is a block diagram of a collaborative session using a distributed locking apparatus according to the present invention.

A collaborative computing session is shown in FIG. 1. The user of each workstation 10 (indicated individually as 10a, 10b, 10c, and 10d) is joined in a video conferencing session over network 12. Each workstation includes a series of collaborative computing modules 14, 16, 18, and 20, and a series of corresponding lock engines 24, 26, 28, and 30, one for each collaborative module. This enables there to be a separate lock for each collaborative module. Where appropriate, a collaborative computing module may have no corresponding lock engine or more than one corresponding lock engine, or a lock engine may be shared by multiple collaborative computing modules. Collaborative module 14 may be, for example, for video conferencing, while collaborative module 16 is for a whiteboard session, collaborative module 18 is for audio conferencing, and collaborative module 20 is for a text tool. These collaborative computing modules may include both software and hardware, and are described in more detail in commonly-assigned U.S. patent application Ser. No. 08/401,922, entitled "Apparatus for Collaborative Computing," which is incorporated herein by reference In the example shown, workstation 10a has the lock for software module 14, and thus the lock engine 24 for software module 14 is in the HELD state (indicated by the letter H in the Figures) and the lock engine 24 for software module 14 of each other workstation in the session (i.e., workstations 10b, 10c, and 10d) is in the LOCKED state (indicated by the letter L in the Figures).

Although the lock engines are described as separate entities from the collaborative computing modules, it is understood that the lock engine and the collaborative computing module could be two parts of an integrated collaborative module.

Figure 2:
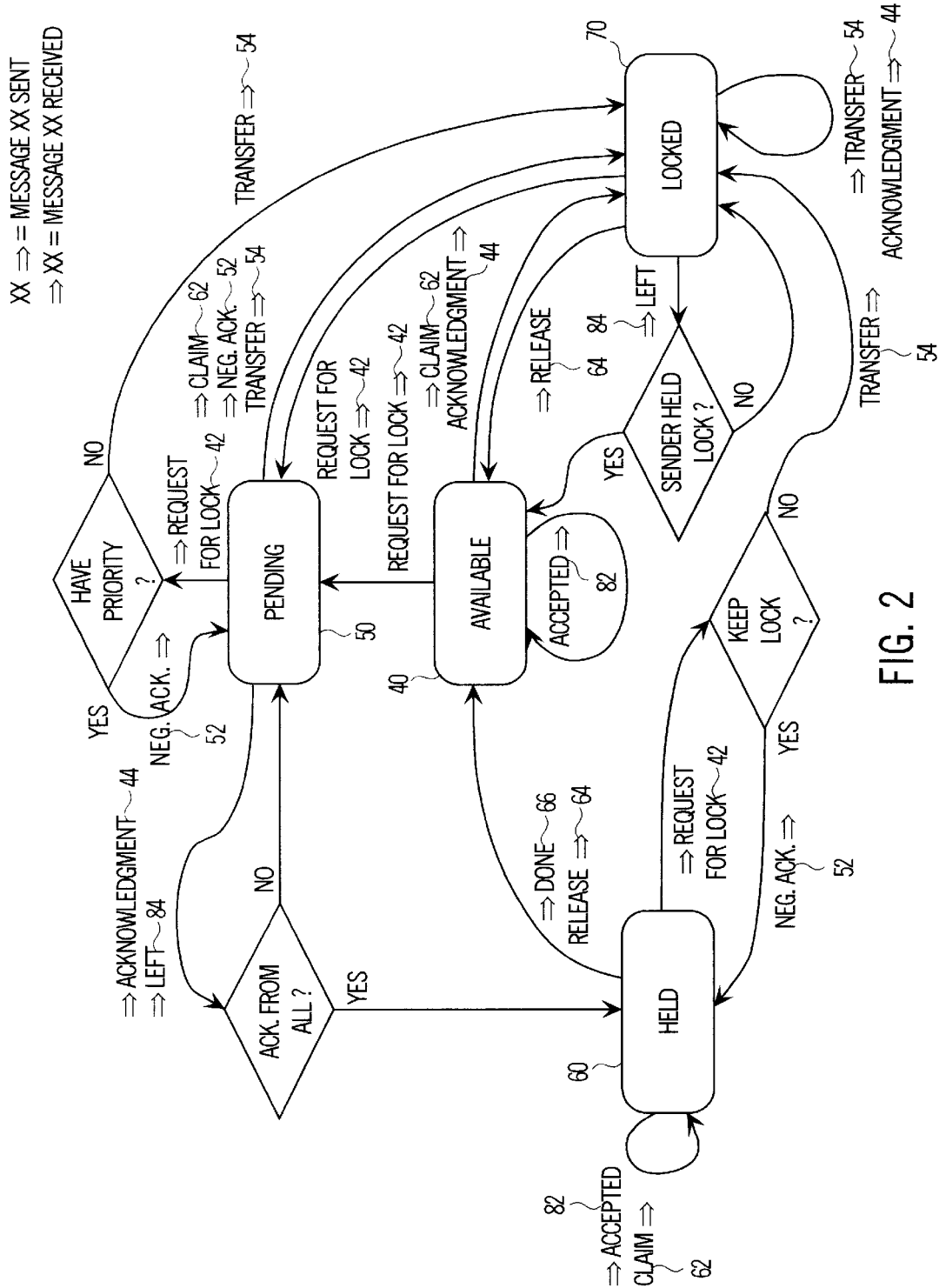
FIG. 2 is a state diagram illustrating a transition between states using a distributed locking apparatus according to the present invention.

Lock engines 24, 26, 28, and 30 each contain a state machine 34, which at any time can be in AVAILABLE state 40, PENDING state 50, HELD state 60, or LOCKED state 70. A state diagram for the state machine 34 of lock engines 24, 26, 28, or 30 of FIG. 1, illustrating the transitions between the states, is shown in FIG. 2. When a member of a collaborative session is not aware of any member of the session that has the lock, the member will be in the AVAILABLE state 40. Generally, in the absence of exceptions and after all members have transitioned, if one member is in the AVAILABLE state 40 then all members will be in the AVAILABLE state 40 or the PENDING state 50. AVAILABLE state 40 indicates that the lock is available.

PENDING state 50 indicates that the session member has sent a request for the lock to the other session members and is awaiting acknowledgment. In a preferred embodiment, a session member will send a request for the lock only if it is in the AVAILABLE state 40.

HELD state 60 indicates that the session member currently holds the lock. LOCKED state 70 indicates that another session member currently holds the lock. Generally, in the absence of exceptions, if one member of a collaborative session is in the HELD state 60, the other members will be in the LOCKED state 70.

Once in the HELD state 60, a member remains in that state until it releases the lock and transitions to the AVAILABLE state 40.

In a preferred embodiment, a member will request the lock only if it is in the AVAILABLE state 40. However, as described in more detail below, a member could be permitted to request the lock from the LOCKED state 70, which would require the member in the HELD state 60 first to transfer or release the lock.

Figure 3A:
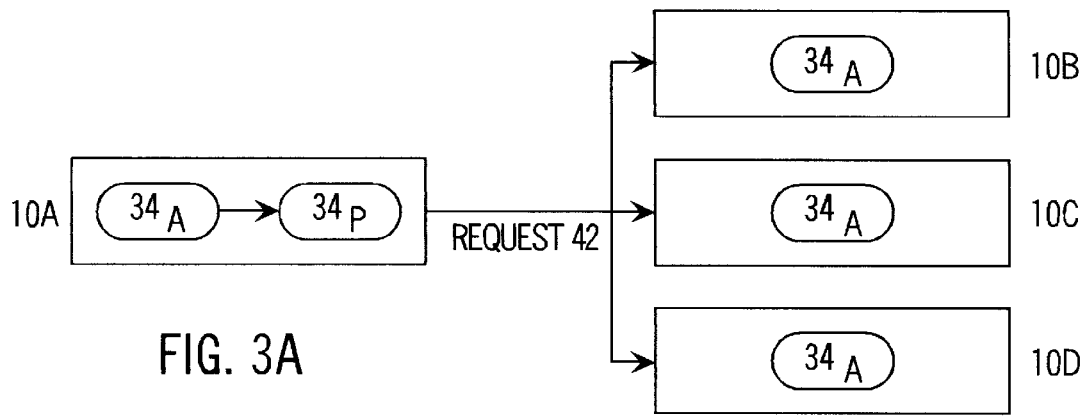
FIGS. 3A, 3B, and 3C illustrate a first message sequence for a distributed locking apparatus according to the present invention.
Figure 3B:
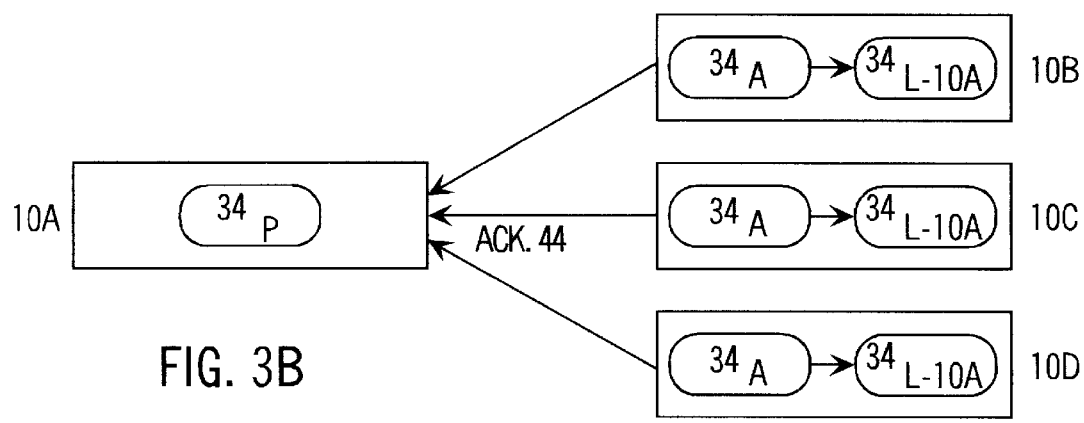
Figure 3C:
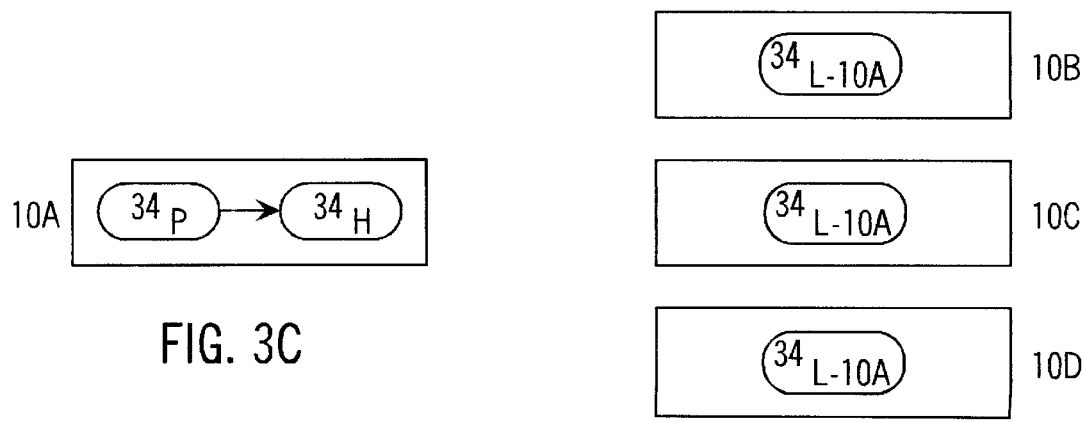

From the AVAILABLE state 40 (and, alternatively, from the LOCKED state 70), a member 10a can send a Request for Lock message 42 to the other members (10b, 10c, and 10d), as illustrated in FIGS. 2 and 3A. Upon sending the Request for Lock message 42, member 10a transitions to the PENDING state 50 (indicated by the letter P in the Figures). The other members (10b, 10c, and 10d), if they are in the AVAILABLE state 40 (indicated by the letter A in the Figures), respond to the Request for Lock message 42 by sending an Acknowledgment message 44 to member 10a and transitioning from the AVAILABLE state 40 to the LOCKED state 70, as illustrated in FIGS. 2 and 3B. The other members (10b, 10c, and 10d) also store the identity of the member (10a) that holds the lock. When requesting member 10a has received the Acknowledgment 44 from each other member (10b, 10c, and 10d), it transitions from the PENDING state 50 to the HELD state 60, as illustrated in FIGS. 2 and 3C.

Figure 11:
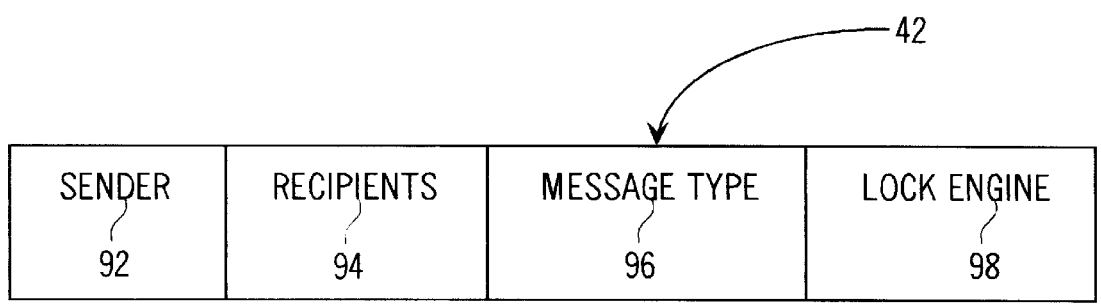
FIG. 11 illustrates the format of a message used with a distributed locking apparatus according to the present invention.

Preferably, all messages include the identity of the member sending the message and the identities of each member that is to receive the message. In addition, each message for the distributed locking mechanism includes a field indicating the lock to which it applies, so it will be delivered to the proper lock engine. The format for a Request for Lock message 42 is shown in FIG. 11. Sender field 92 identifies the member sending the message. Recipients field 94 identifies the intended recipients of the message, which for Request for Lock message 42 are each member of the collaborative session. Preferably, Recipients field 94 is in the form of a bit-mapped list of the members of the collaborative session. Message Type field 96 identifies the type of message. Lock Engine field 98 provides the identity of the particular lock engine (e.g., the lock engine for a video conferencing collaborative session) within workstation 10 that is to receive the message.

In a preferred embodiment, each lock engine maintains a list 36 of each member of the collaborative session and a record of acknowledgments in the form of a bit-mapped list 38 of the members. As each acknowledgment to a Request for Lock message 42 is received, member 10a switches the appropriate bit from a 0 to a 1. If any of the bits are still 0, member 10a remains in the PENDING state 50. Once all of the bits are 1, indicating that all members have acknowledged, member 10a transitions to the HELD state 60.

Figure 4A:
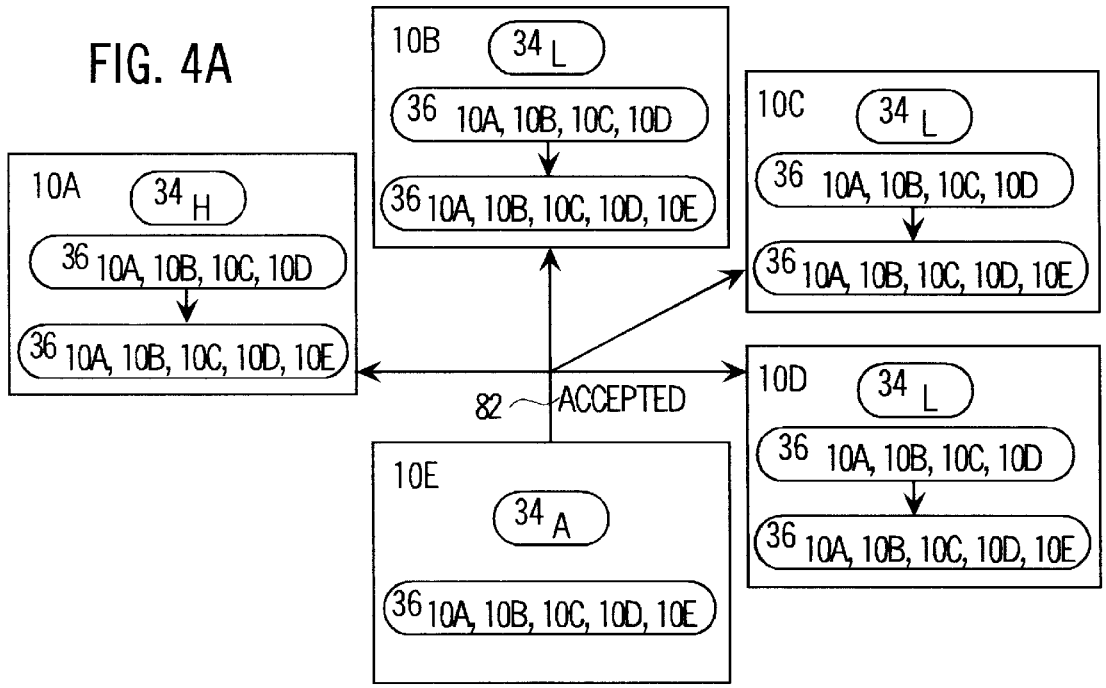
FIGS. 4A and 4B illustrate a second message sequence for a distributed locking apparatus according to the present invention.
Figure 4B:
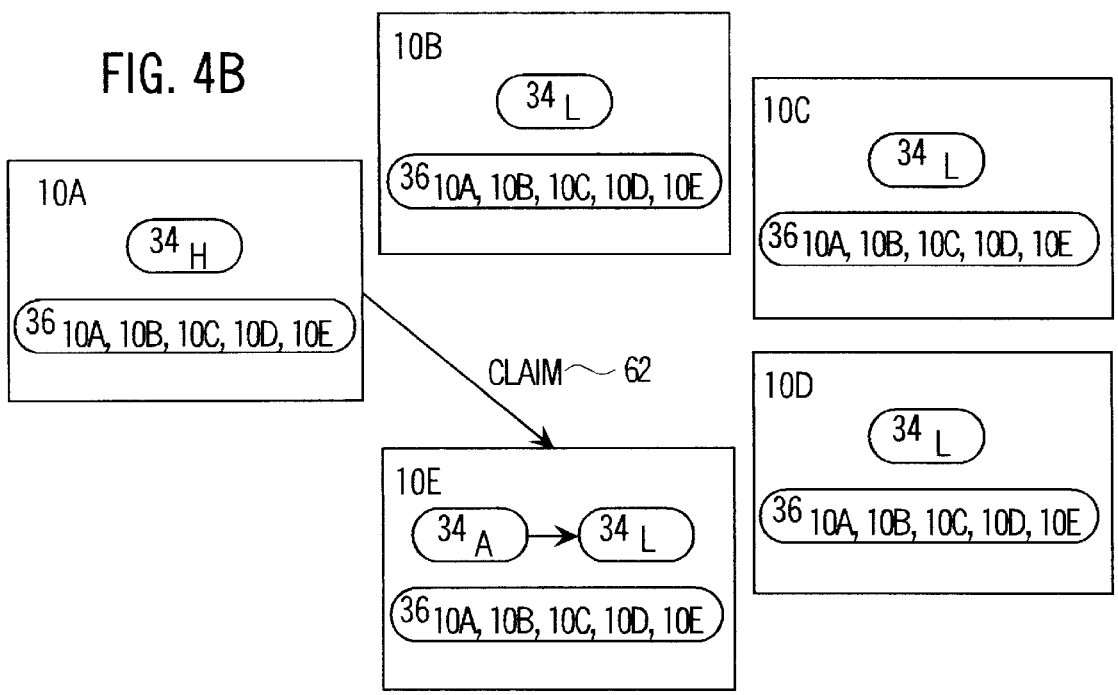

When a new member joins a collaborative session already in progress, it initially will be in the AVAILABLE state 40. Preferably, the new member immediately sends an Accepted message 82 to the other members, indicating that it has been accepted into the collaborative session. In a preferred embodiment, the Accepted message 82 is also used outside of the distributed locking system and is sent to the appropriate collaborative computing module in addition to being routed to the lock engine of each other member. The other members respond to the Accepted message by updating their lists of members. If a member has the lock, then upon receiving the Accepted message 82, it will send a Claim message 62 to the new member. As illustrated in FIGS. 2, 4A, and 4B, member 10a holds the lock and is in the HELD state 60 when it receives the Accepted message 82 from new member 10e. The other members (10b, 10c, and 10d) are in the LOCKED state 70, and also receive the Accepted message from new member 10e. Upon receiving the Accepted message 82, member 10a sends the Claim message 62 to new member 10e. Upon receipt of Claim message 62, new member 10e transitions to the LOCKED state 70.

Figure 5A:
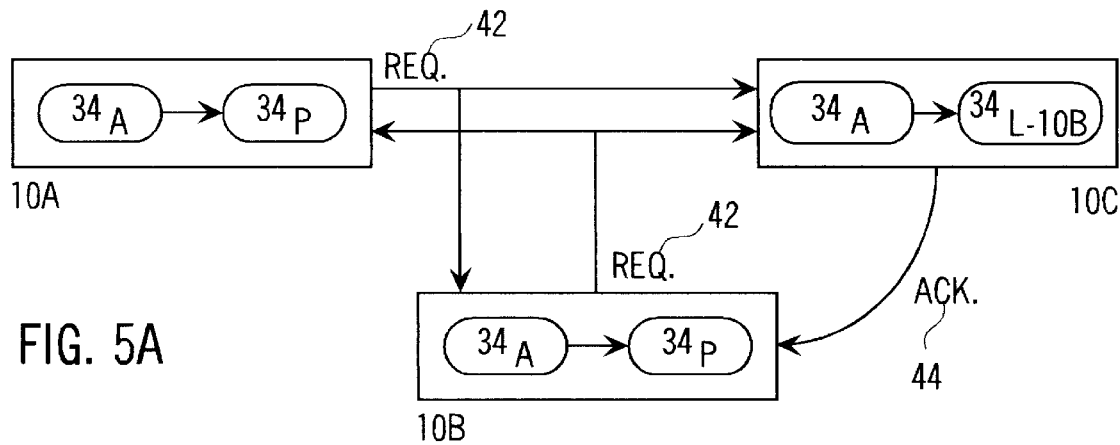
FIGS. 5A, 5B, 5C illustrate a third message sequence for a distributed locking apparatus according to the present invention.

When the lock is not held (i.e., the members are in the AVAILABLE state 40), two members might request the lock before either receives the Request for Lock message. As illustrated in FIGS. 2 and 5A, members 10a and 10b each send a Request for Lock message 42 and transition from the AVAILABLE state 40 to the PENDING state 50. Member 10c responds only to the first Request for Lock message 42 that it receives. Accordingly, member 10c sends an Acknowledgment 44 to member 10b, whose Request for Lock message 42 it received first, and transitions to the LOCKED state 70. As explained below, if the resolution of the conflict over the lock between members 10a and 10b is that member 10a receives the lock, then member 10c will send an Acknowledgment 44 to member 10a upon receipt of notice of the resolution, and will change its record of the member that holds the lock.

Figure 5B:
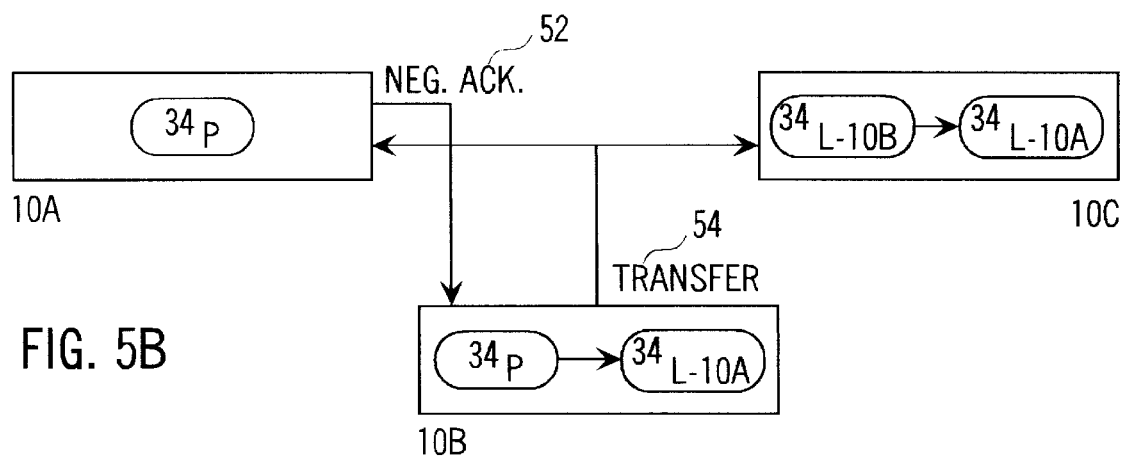

Member 10a receives the Request for Lock message 42 from member 10b and checks whether it has a lower handle than member 10b. Since member 10a has a lower handle, it sends a Negative Acknowledgment message 52 to member 10b, as illustrated in FIGS. 2 and 5B. Alternatively, other methods could be used to determine which member receives the lock. For example, in case of conflict, both lock requests could fail with each requesting member required to wait a random time period before sending another Request for Lock message 42. This method is similar to the algorithm used when collisions are detected on an Ethernet local area network.

Figure 5C:
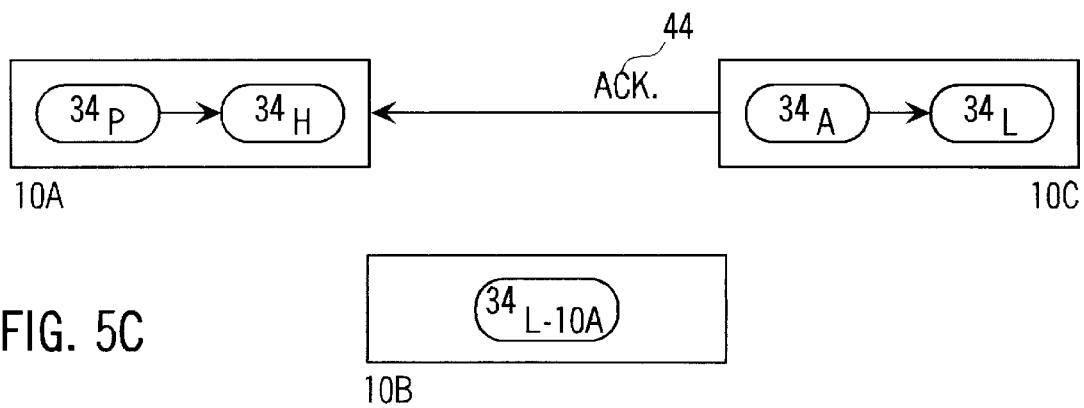

Member 10b receives the Request for Lock message 42 from member 10a and likewise checks whether it has the lower handle. Since member 10a has the lower handle, member 10b sends a Transfer message 54 to the other members (10a and 10c), indicating that it has transferred its Request for Lock to member 10a. Transfer message 54 includes a field indicating the member (10a) to whom member 10b is transferring its Request for Lock. Preferably, member 10b also sends an Acknowledgment 44 to member 10a. However, Transfer message 54 could also serve as an acknowledgment. Upon receipt of the Transfer message 54 from member 10b, member 10c sends its Acknowledgment 44 to member la, as illustrated in FIGS. 2 and 5C.

Figure 6A:
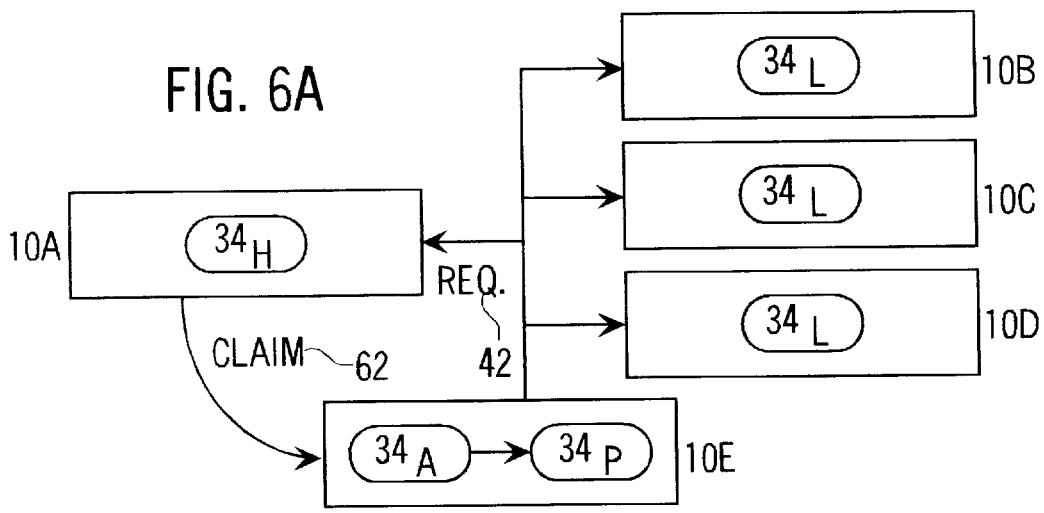
FIGS. 6A, 6B, and 6C illustrate a fourth message sequence for a distributed locking apparatus according to the present invention.
Figure 6B:
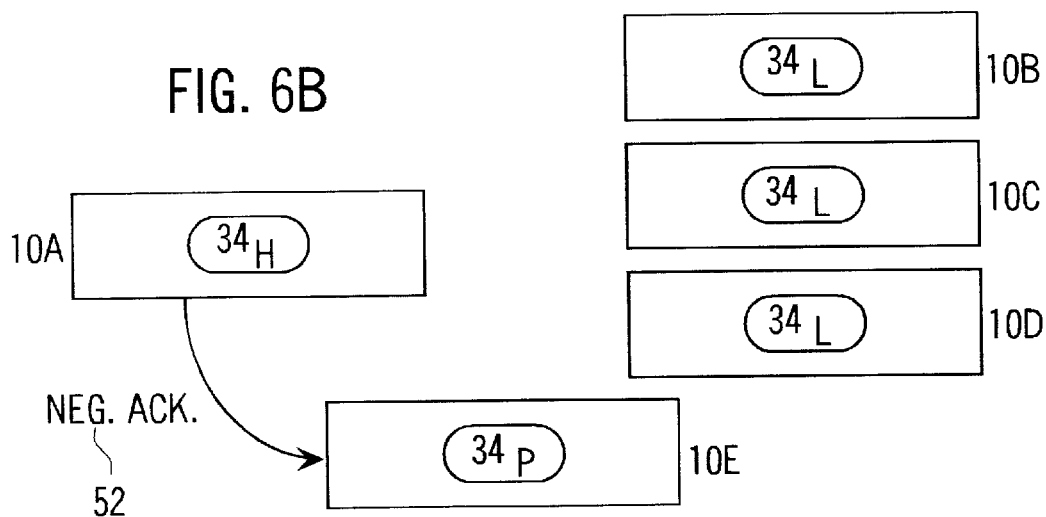
Figure 6C:
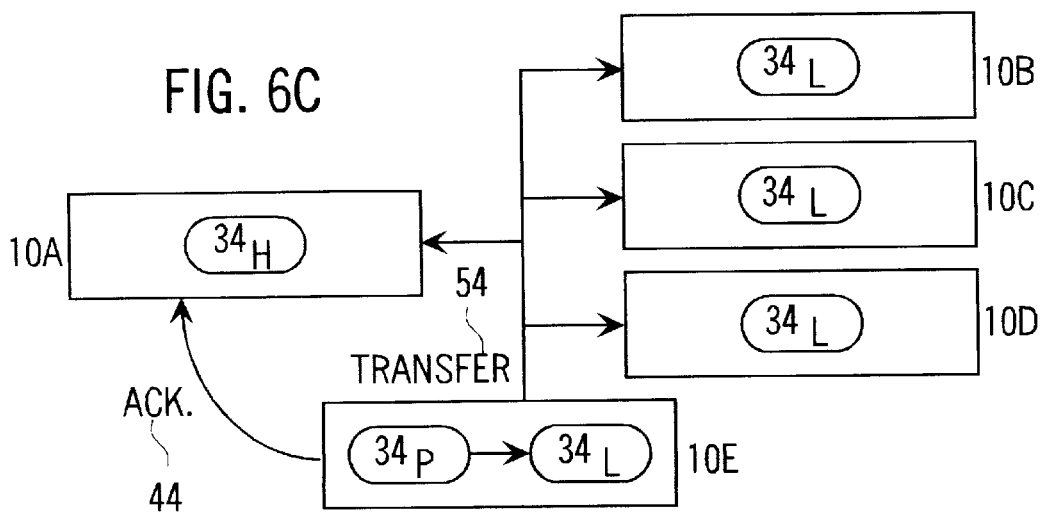

If new member 10e sends a Request for Lock message 42 before receiving the Claim message 62 (as illustrated in FIGS. 2 and 6A), it will transition to the PENDING state 50. New member 10e will then receive the Claim message 62 and a Negative Acknowledgment message 52 from member 10a (as illustrated in FIGS. 2 and 6B). Upon receipt of either the Claim message 62 or the Negative Acknowledgment 52, new member 10e sends a Transfer message 54 to the other members and an Acknowledgment 44 to member 10a, as illustrated in FIGS. 2 and 6C. Because Transfer message 54 indicates that the lock is being transferred to member 10a, which members 10b, 10c, and 10d already recognize as holding the lock, it is not necessary for members 10b, 10c, and 10d to send a new Acknowledgment to member 10a.

Figure 7A:
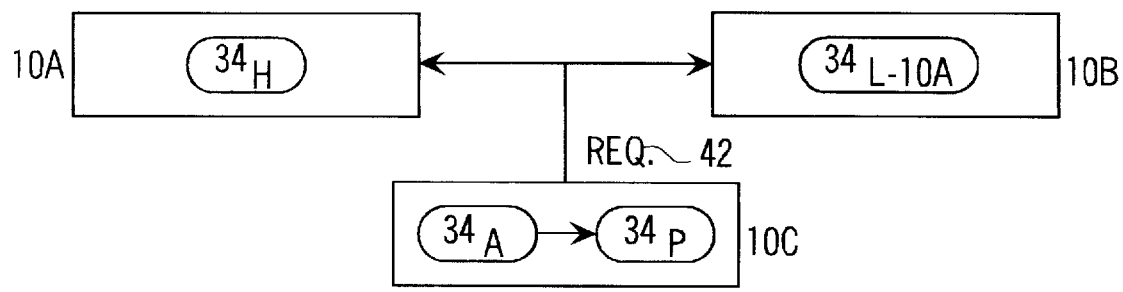
FIGS. 7A and 7B illustrated a fifth message sequence for a distributed locking apparatus according to the present invention.
Figure 7B:
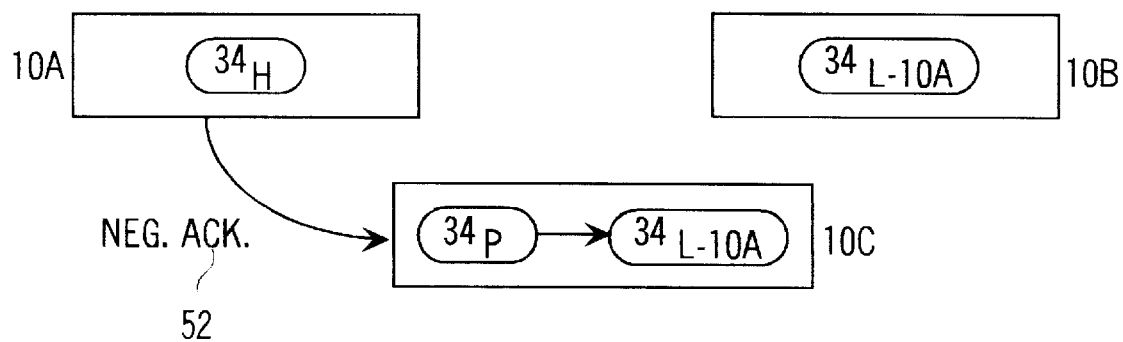

If a member (10a) receives a Request for Lock message 42 (from member 10c) when the member (10a) is in the HELD state 60 (FIGS. 2 and 7A), the member (10a) will send a Negative Acknowledgment 52 to the sending member (10c) (FIGS. 2 and 7B). This could occur, for example, if a new member joins the collaborative session and immediately sends a Request for Lock message 42 while it is in its initial AVAILABLE state 40. Preferably, if a member is in the LOCKED state 70, it will not send a Request for Lock message 42. Alternatively, a member in the LOCKED state 70 could send a Request for Lock message 42, to which the member in the HELD state 60 could respond with a Negative Acknowledgment 52 (indicating that the member in the HELD state 60 will keep the lock), a Transfer message 54 (indicating that the member in the HELD state 60 is transferring the lock to the member that sent the Request for Lock message 42), or a Release message 64 (indicating that the member in the HELD state 60 is releasing the lock, but not guaranteeing that the requesting member will receive the lock).

Figure 8A:
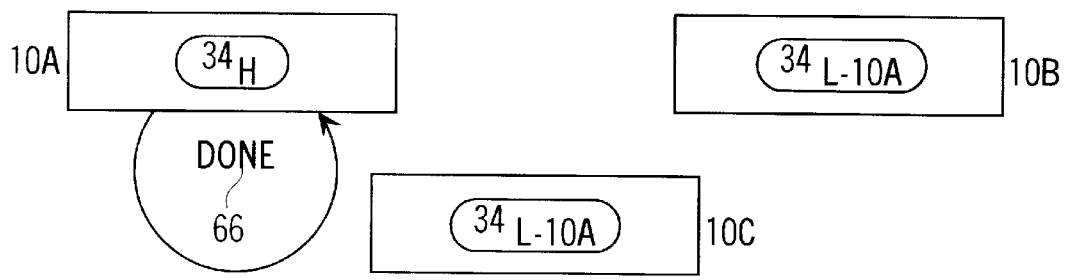
FIGS. 8A and 8B illustrate a sixth message sequence for a distributed locking apparatus according to the present invention.
Figure 8B:
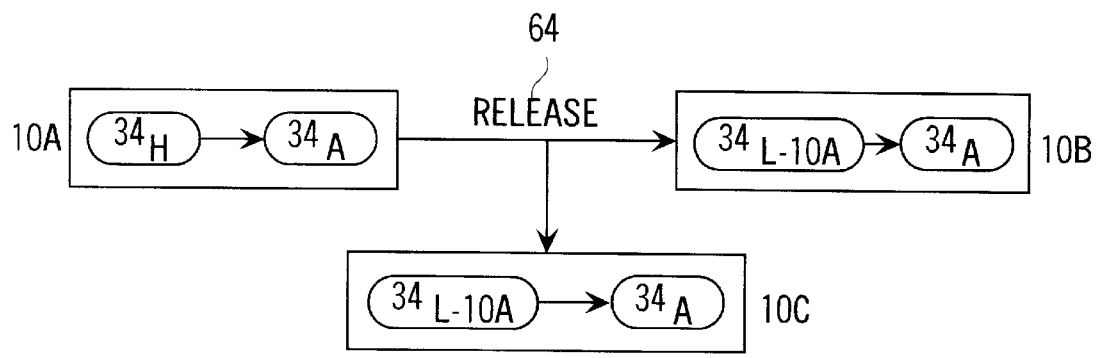

To release a lock it holds, member 10a sends a Done message 66 to its lock engine, as illustrated in FIGS. 2 and 8A. Member 10a then responds to the Done message 66 by sending a Release message 64 to the other members (10b and 10c) and transitioning to the AVAILABLE state 40, as illustrated in FIGS. 2 and 8B. Members 10b and 10c, upon receipt of the Release message 64, transition from the LOCKED state 70 to the AVAILABLE state 40.

Figure 9A:
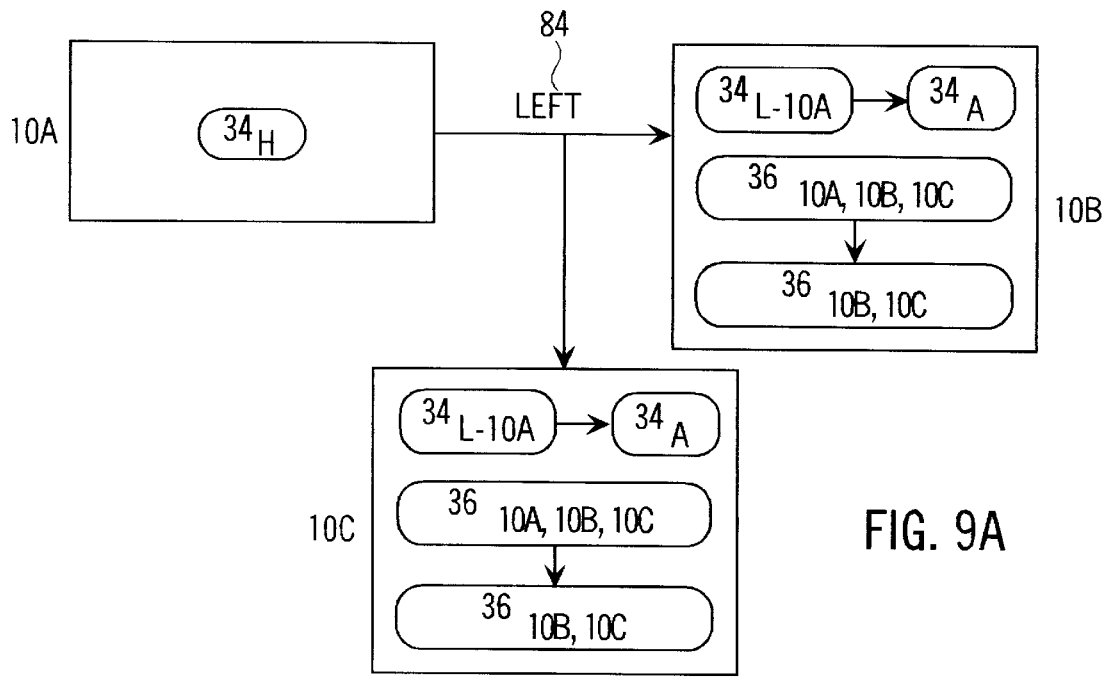
FIGS. 9A and 9B illustrate a seventh message sequence for a distributed locking apparatus according to the present invention.
Figure 9B:
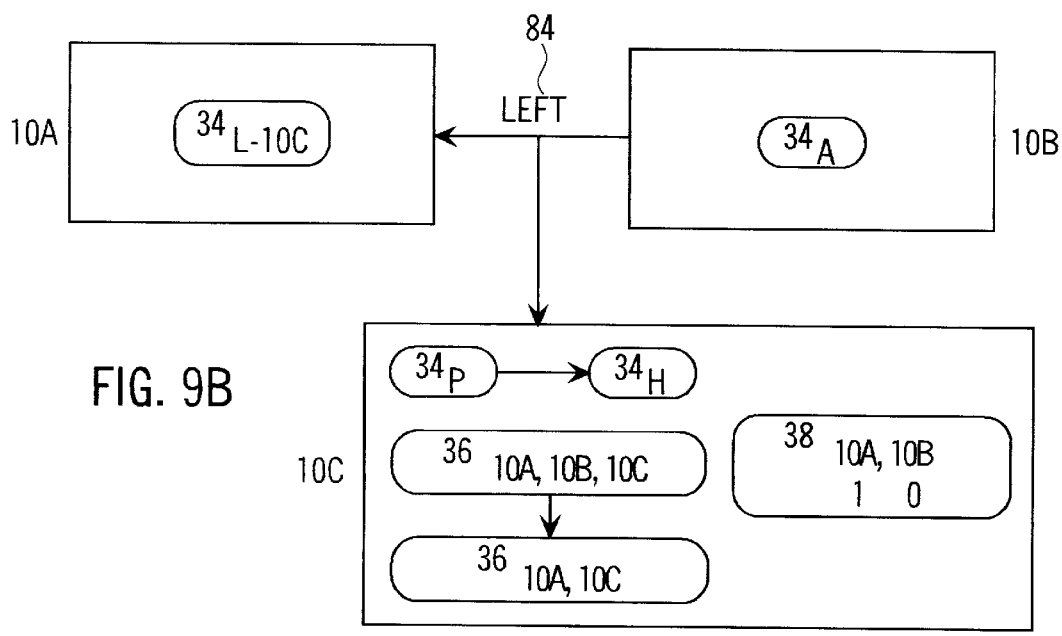

Preferably, if a member leaves the collaborative session, it sends a Left Session message 84 to the other members. As with Accepted message 82, Left Session message 84 is also used outside of the distributed locking system, but is also routed to the lock engine of each other member. The other members respond to the Left Session message 84 by updating their lists of members. In addition, if the member that sent the Left Session message 84 (member 10a) was in the HELD state 60 and left without first sending a Release message 64, the other members, 10b and 10c (which keep a record of the member that holds the lock), will transition to the AVAILABLE state 40, as illustrated in FIGS. 2 and 9A. If a member (10c) was in the PENDING state 50 and another member (10b) sends a Left Session message 84 without first sending an Acknowledgment message 44, the member (10c) requesting the lock will update its list of members. If, as a result, all remaining members have now acknowledged the Request for Lock message 42, the member (10c) requesting the lock will transition to the HELD state 60. As illustrated in FIGS. 2 and 9B, member 10a has already acknowledged Request for Lock message 42 and has transitioned to the LOCKED state 70. Record of acknowledgments 38 of member 10c indicates that member 10a has acknowledged but member 10b has not acknowledged. Upon receipt of Left Session message 84 from member 10b and the updating of the list of members 36, member 10b will be removed from the record of acknowledgments 38. At this point, all remaining members have acknowledged and member 10c transitions to HELD state 60.

Figure 10A:
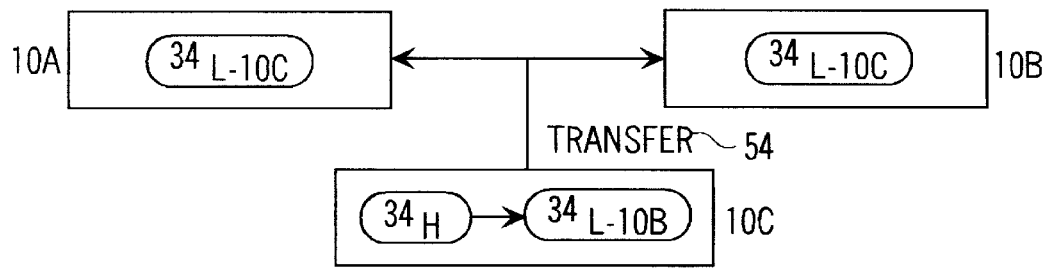
FIGS. 10A and 10B illustrate an eighth message sequence for a distributed locking apparatus according to the present invention.
Figure 10B:
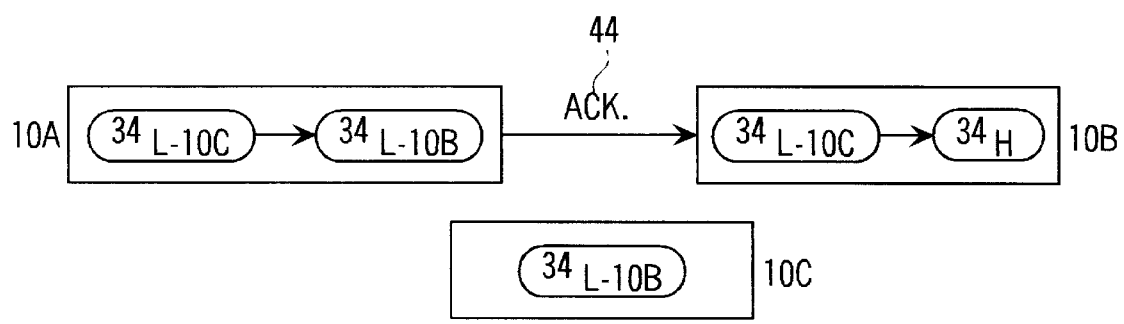

When a member is in the LOCKED state 70, it will not respond to a Request for Lock message 42. It will remain in the LOCKED state 70 and let the member in the HELD state 60 respond to the Request for Lock message 42. If a member (shown as 10a in FIG. 10A) in the LOCKED state 70 receives a Transfer message 54 (from member 10c) indicating that the lock is being transferred to another member (10b), it will send an Acknowledgment message 44 to the member that is receiving the lock (10b), and will remain in the LOCKED state 70 (as shown in FIGS. 2 and 10B). Member 10a will also update its record of the identity of the member that holds the lock. After member 10b in the LOCKED state 70 receives the Transfer message 54 (from member 10c) indicating that the lock is being transferred to member 10b, member 10b responds by transitioning to the HELD state 60.

Although for purposes of clarity the Figures and preceding discussion identify only a few members, it is understood that the distributed locking system may be implemented with any size collaborative session.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

What is claimed is:

1. An apparatus for collaborative computing comprising:
a plurality of workstations; and
a network connecting each of the plurality of workstations,
wherein each of the plurality of workstations includes
a collaborative computing module for engaging in a collaborative computing session,
means for sending a lock request to each of the other workstations for the collaborative computing module when the apparatus seeks to obtain a lock for the collaborative computing session;
means for receiving an acknowledgement from each of the other workstations; and
a lock engine for obtaining and releasing the lock for the collaborative computing module, wherein the lock engine has an available state, for indicating that the lock is available; a pending state, for indicating that the lock engine has sent the lock request to each of the other workstations and that the lock engine is awaiting the acknowledgement from each of the other workstations; a held state, for indicating that the lock engine holds the lock; and a locked state, for indicating that the lock is held by another lock engine at one of the other workstations.

2. The apparatus for collaborative computing as in claim 1, wherein each of the plurality of workstations further includes a record of each of the other of the plurality of workstations.

3. A digital processing system for engaging in a collaborative computing session with at least one other member digital processing system, comprising:

means for storing a record within the digital processing system of each of the at least one other members in the collaborative computing session;

means for sending a lock request message to each of the other members when the digital processing system seeks to obtain a lock for the collaborative computing session;

means for transitioning the digital processing system to a held state, indicating that the digital processing system holds the lock, if the digital processing system receives an affirmative acknowledgment from each of the other members after sending the lock request message; and means for transitioning the digital processing system to a locked state, indicating that one of the other members holds the lock, if the digital processing system receives a negative acknowledgment from any of the other members after sending the lock request message.

4. The digital processing system as in claim 3, further comprising means for transitioning the digital processing system to a pending state, indicating that the digital processing system has requested the lock, after sending the lock request message to the other workstations.

5. The digital processing system as in claim 4, further comprising means for sending, if the digital processing system is in the pending state, a negative acknowledgment upon receipt of a lock request message having a lower priority than the lock request message sent by the digital processing system and a transfer message upon receipt of a lock request message having a higher priority than the lock request message sent by the digital processing system.

6. The digital processing system as in claim 5, wherein the priority of a lock request message sent by the digital processing system includes a handle of the digital processing system.

7. The digital processing system as in claim 5, further comprising means for transitioning the digital processing system from the pending state to the held state upon receipt of an affirmative acknowledgment or a transfer message from each of the other members.

8. The digital processing system as in claim 3, further comprising means for sending a negative acknowledgment to one of the other members upon receipt of a lock request message from the one of the other members if the digital processing system is in the held state.

9. The digital processing system as in claim 3, further comprising means for sending one of a negative acknowledgment to one of the other members or a lock release message to each of the other members upon receipt of a lock request message from the one of the other members if the digital processing system is in the held state.

10. The digital processing system as in claim 3, further comprising means for sending one of a negative acknowledgment to one of the other members or a lock transfer message to each of the other members upon receipt of a lock request message from the one of the other members if the digital processing system is in the held state.

11. The digital processing system as in claim 3, further comprising means for sending a lock release message to each of the other members when the digital processing system releases the lock.

12. The digital processing system as in claim 3, further comprising means for sending a claim message to a new member, indicating that the digital processing system holds the lock, upon receipt of a message indicating the new member has joined the collaborative computing session, if the digital processing system is in the held state.

13. The digital processing system as in claim 12, further comprising means for sending a message to other members of a new collaborative computing session, indicating that the digital processing system has joined the new collaborative computing session.

14. The digital processing system as in claim 13, further comprising means for transitioning the digital processing system from the locked state to an available state, indicating that the lock is available, upon receipt of a lock release message.

15. The digital processing system as in claim 14, wherein the means for sending a lock request message includes means for sending the lock request message only if the digital processing system is in the available state.

16. A method for distributing a lock for a collaborative computing session among a plurality of workstations engaged in the collaborative computing session comprising the steps of:

sending a lock request message from a first of the workstations to each of the other workstations;

receiving at the first of the workstations a response from each of the other workstations; and transitioning the first workstation to a held state, indicating the first workstation holds the lock, if the received response from each of the other workstations is an affirmative acknowledgement.

17. The method for distributing a lock according to claim 16, further comprising the step of transitioning the first workstation to a pending state, indicating that the first workstation has requested the lock, after the sending step.

18. The method for distributing a lock according to claim 17, further comprising the step of sending, if the first workstation is in the pending state, a negative acknowledgement to one of the other workstations upon receipt of a lock message from the one of the other workstations, the lock message having a lower priority than the lock request message sent by the first workstation, and a transfer message to the one of the other workstations upon receipt of a lock request message from the one of the other workstations, the lock message having a higher priority than the lock request message sent by the first workstation.

19. The method for distributing a lock according to claim 16, further comprising the steps of sending a lock release message from the first workstation to the other workstations when the first workstation is in the held state and is releasing the lock: and transitiong the first workstastion from the held state to an available state, indicating that the lock is available when the first workstation releases the lock.

* * * * *